Figure 1:
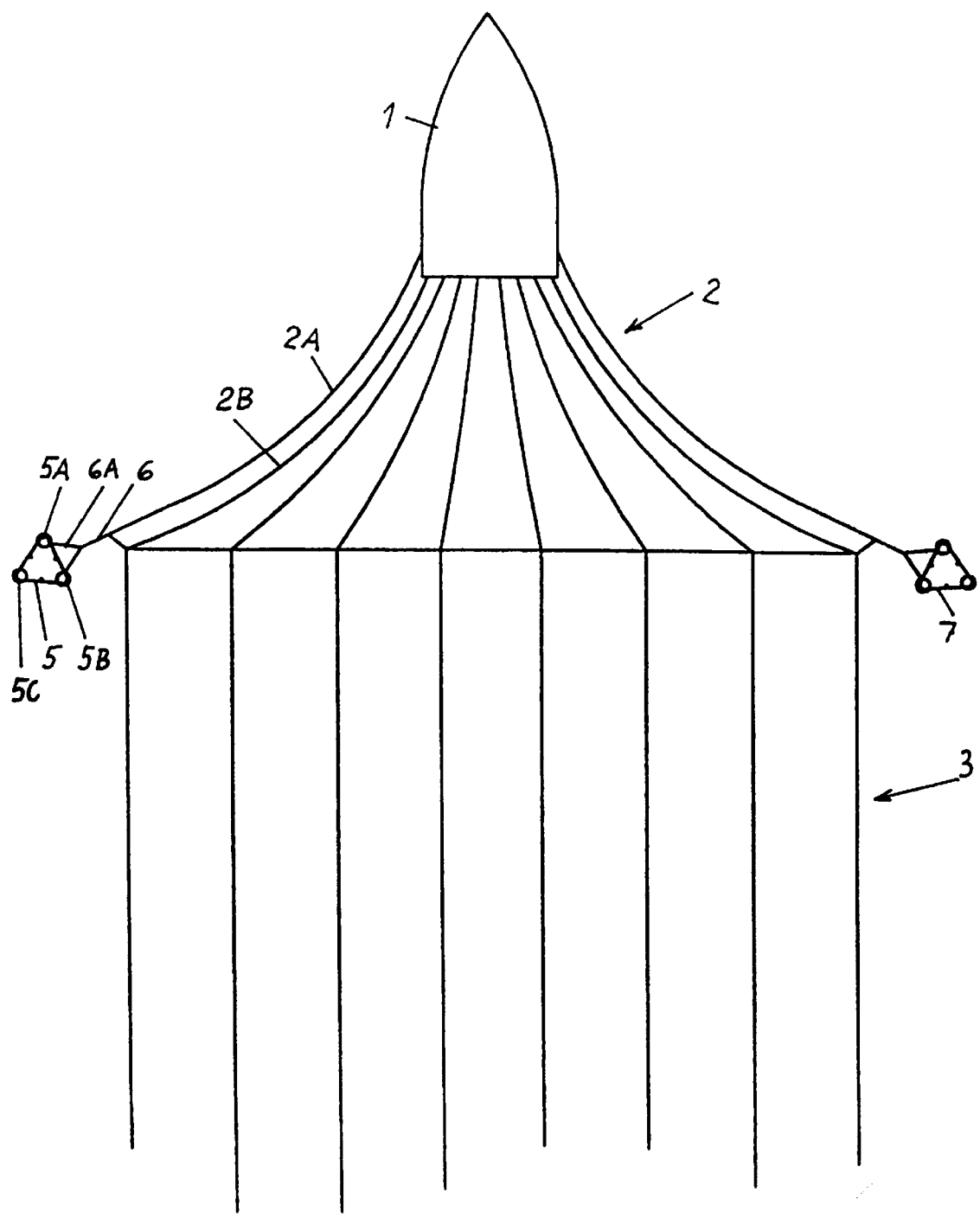

United States Patent [19]
Henriksen

[11] Patent Number: 6,142,091
[45] Date of Patent: Nov. 7, 2000

[54] DEFLECTOR

[75] Inventor: Ove Henriksen, Bølandet, Norway, N-6095

[73] Assignees: Ove Henriksen, Bolandet; Kristian Evjen, Soreidgrend, both of Norway; Dave Pratt, Houston, Tex.

[21] Appl. No.: 09/194,303

[22] PCT Filed: May 26, 1997

[86] PCT No.: PCT/NO97/00131

§ 371 Date: Nov. 4, 1999

§ 102(e) Date: Nov. 4, 1999

[87] PCT Pub. No.: WO97/45006

PCT Pub. Date: Dec. 4, 1997

[30] Foreign Application Priority Data

May 28, 1996 [NO] Norway ..................................... 962167

[51] Int. Cl.[7] ...................................................... B63G 8/22
[52] U.S. Cl. ............................................................ 114/245
[58] Field of Search ..................................... 114/242, 244, 114/245, 246, 247

[56] References Cited

U.S. PATENT DOCUMENTS

| 3,404,655 | 10/1968 | Fohl | 114/245 |
| 3,797,444 | 3/1974 | Stubbs | 114/244 |

FOREIGN PATENT DOCUMENTS

| 1596275 | 8/1981 | United Kingdom | 114/245 |

*Primary Examiner*—Jesus D. Sotelo
*Attorney, Agent, or Firm*—Cohen, Pontani, Lieberman & Pavane

[57] ABSTRACT

Deflector device for lateral spreading of equipment being towed in water by a vessel, such as seismic exploration, fishing or mine sweeping. The device comprises at least one cylinder (35A–C) adapted to have its axis standing generally vertically in the water during towing. The cylinder or cylinders (35A–C) is/are rotatable and there is provided at least one motor for rotation of the cylinder or cylinders.

14 Claims, 3 Drawing Sheets

DEFLECTOR

This invention relates to a deflector for lateral spreading of equipment being towed in water by a vessel, such as during seismic exploration, fishing or mine sweeping.

Such devices of known design are substantially passive in their manner of operation, i.e. without any supplied driving power from an associated motor or the like. Typical examples of known designs are the so-called "trawl doors", being incorporated in trawling gear employed by fishing vessels. In mine sweeping there has been employed during long times for similar purposes, the so-called paravanes. At the outset the invention is directed to a deflector intended in particular for seismic exploration, but the deflector device may also be used in other applications, such as in fishing gear or mine sweeping equipment.

The invention is based on an effect known per se in the form of "lift", that occurs when a rotating cylinder is located in a flowing medium (Flettner rotor). By utilizing this effect there is according to the invention obtained an active deflector device for the above purpose, when employing motor power for rotation of one or more cylinders.

More particularly the deflector according to the invention is mainly characterized in that it comprises at least one cylinder adapted to have its axis oriented substantially vertically in the water during towing, that the cylinder or cylinders is/are rotatable and that there is provided at least one motor for rotating the cylinder or cylinders.

In practical embodiments of the device according to the invention it is preferred to employ more than one cylinder, preferably three rotating cylinders in each unit.

The deflector device according to the invention can give a very large effect in the form of a laterally directed force or lift for acting on the equipment being towed, at the same time as each unit has moderate dimensions and a very robust configuration with respect to a variety of stresses to which such equipment is subjected during transport, manipulation and towing in the sea.

Figure 2:
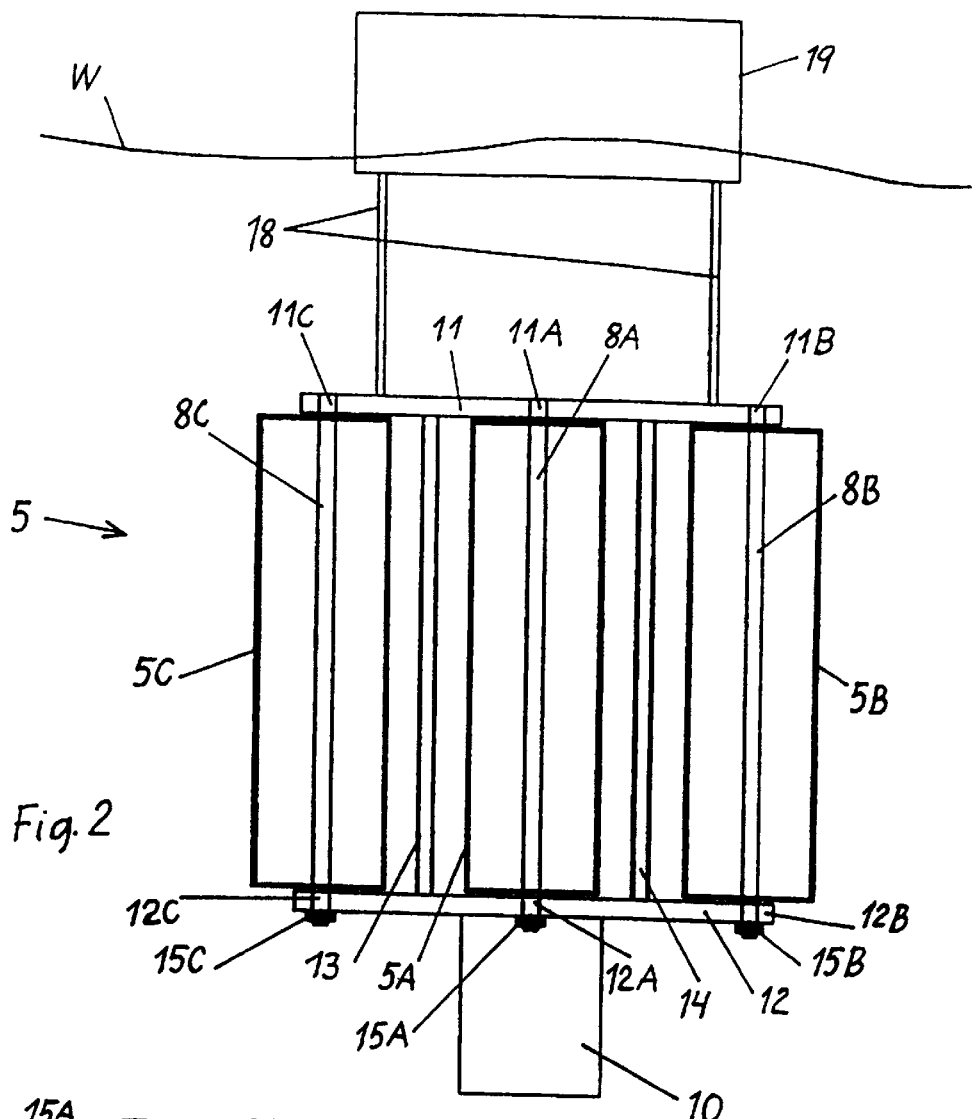
Figure 3:
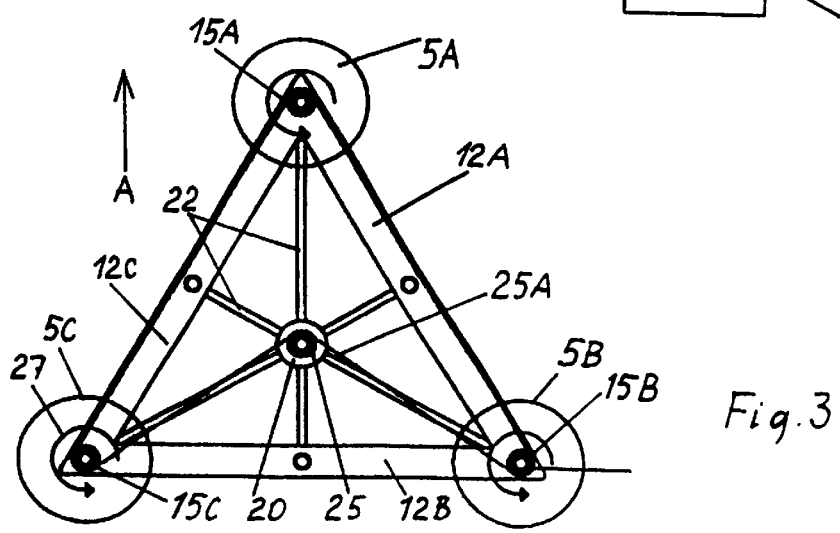
Figure 4:
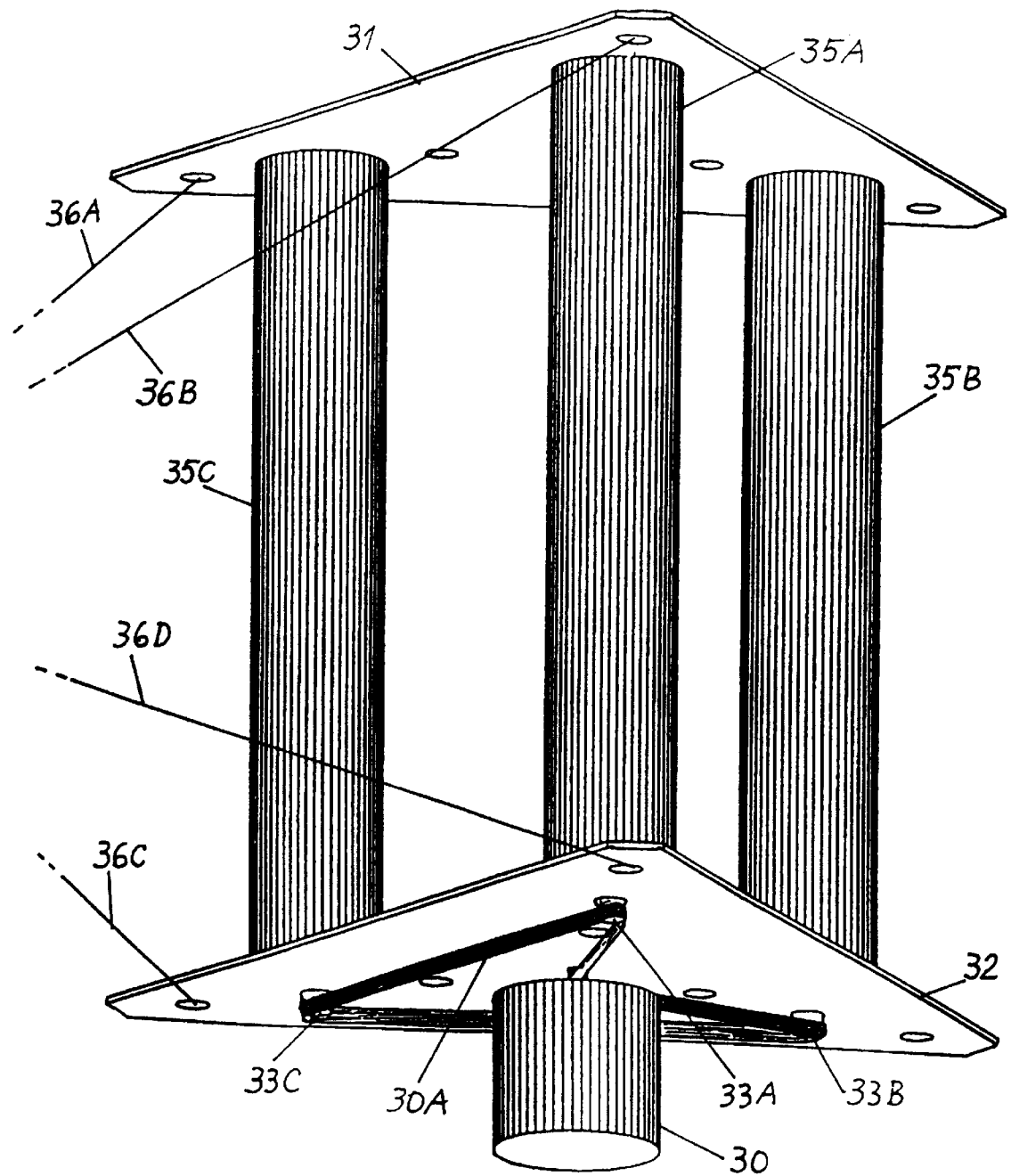

Examplary embodiments of the device according to the invention shall be explained more closely in the following description with reference to the drawings, in which:

FIG. 1 schematically shows the towing of seismic equipment behind a vessel,

FIG. 2 shows an embodiment of the device according to the invention suspended from a float at the water surface, as seen in elevation and partial section, FIG. 3 shows the device of FIG. 2 seen from below and with a motor removed, and FIG. 4 shows another, preferred embodiment of the device according to the invention, in a somewhat simplified manner and in perspective view.

FIG. 1 shows a seismic vessel 1 which via a number of cables or towing wires 2 tows a number of hydrophone cables or streamers 3, whereby the towed equipment also can comprise seismic gun groups. In the example shown eight streamers 3 are incorporated, and these have been pulled out laterally to either side in relation to the centerline of the vessel 1, so that there is established a desired, wide range of coverage during towing of this equipment. For such lateral pulling-out of a towed seismic arrangement to a large width, there are previously known various forms of deflector devices. The particular deflector to be described here, is represented in FIG. 1 by two units, namely a deflector 5 at one side and another deflector 7 at the other side of the towed arrangement, i.e. at the leading end of the seismic streamers 3.

As indicated in particular for deflector device 5, this comprises three cylinders 5A, 5B and 5C being adapted to stand upright approximately vertically in the water during towing, and the device 5 is connected to an outer, port towing wire or cable 2A through a cable piece 6, that may constitute a direct prolongation of the cable 2A. A so-called straddle 6A is arranged between the outer end of cable piece 6 and the actual deflector device or unit 5. In this example cable 2A is provided mainly for towing the deflector 5, but in other embodiments this can be towed without using any separate cable. In such case in the arrangement of FIG. 1, deflector device 5 could be connected through a cable piece 6 to an outer end of the towing wire or cable 2B which primarily serves for the towing of the seismic streamer at the left-most part of FIG. 1.

FIGS. 2 and 3 in some more detail show an embodiment of the device according to the invention, corresponding mainly to the deflector device 5 in FIG. 1. The actual active unit in FIG. 2 is built up with a frame the upper part of which is denoted 11 and the lower part of which is denoted 12. The whole unit is suspended from a float 19 adapted to float at the water surface W, whereby suspension elements 18 connect the float to the deflector device or unit 5. Suspension elements 18 can be in the form of flexible chains or wires, or also rigid elements of steel. Elements 18 are of such length that deflector unit 5 will hang at a desired depth beneath the water surface W. Depending on what is desired in that respect, a float can be provided as a more or less integrated structure on top of unit 5.

At least as a supplement to float 19, the cylinders 5A–C can internally in part or completely have cavities giving buoyancy in water.

In FIGS. 2 and 3 there are shown three rotatable cylinders 5A, 5B and 5C with associated axles 8A–C. As can be seen in particular from FIG. 3 the three cylinders are located in a triangular arrangement, the frame parts 11 and 12 having a corresponding shape. Thus, the lower frame 12 consists of beams 12A, 12B and 12C as well as internal reinforcing elements, of which two are indicated at 22. Besides in FIG. 2 there are shown two braces 13 and 14 between the frames 11 and 12. With an appropriate distribution of buoyancy, mainly provided for by float 19, and the weight of the complete device, this will generally assume a position with cylinders 5A–C approximately vertically in the water, as illustrated in FIG. 1. As a contribution to this a drive motor 10 is suitably located underneath the lower frame part 12, in order to provide for rotation of the cylinders.

The three cylinders are journalled in respective bearings and shown at 11A, 11B and 11C in frame 11, as well as 12A, 12B and 12C respectively in frame 12. The cylinder axles have projecting axle studs underneath frame 12, where there are mounted chain wheels 15A–C or similar means for operation with a common chain, toothed belt or the like from motor 10. The motor is not shown in FIG. 3, but on the other hand a chain wheel 25 attached to the output axle of the motor so as to drive a chain 25A being also trained around three chain wheels 15A–C referred to. Accordingly the three cylinders can be driven in rotation at the same rotational sense as indicated with arrows, including the arrow 27 in cylinder 5C. The motor and the motor axle with drive wheel 25 are mounted and journalled by means of a central boss 20 in frame 12.

It is obvious that instead of a common motor 10 as just explained, there can be provided a separate motor for each individual rotating cylinder.

As regards the absolute and relative dimensions in a deflector device according to the invention, these can vary within wide limits, depending in particular on the magnitude of the laterally directed power being desired, whereby the towing speed is to be taken into consideration. For obtaining a favourable flow pattern during operation, it is considered to be advantageous however, to have a mutual spacing between the cylinders, being substantially larger than the cylinder diameter, preferably more than twice the cylinder diameter. This latter condition is apparently satisfied by the device in the embodiment shown in FIG. 3. Moreover in practice it is preferred that the length of each cylinder is substantially larger than the cylinder diameter, preferably several times the cylinder diameter. This is approximately as illustrated in FIG. 2.

In a device comprising two, three or more rotating cylinders it is of much significance that the flow pattern around these does not lead to mutually undesirable relationships, i.e. disturbance of the intended flow pattern around one or more trailing cylinders, from a cylinder standing more forwardly in the movement direction during operation. In other words the cylinders in the device should be so located in relation to each other that during towing they do not move directly in the wash from another. Apparently it will be easier to obtain this when the relationship between cylinder diameter and mutual spacing is as explained above.

In view of these desired flow conditions, one could imagine that it would be advantageous to have an arrangement of the cylinders substantially in the same plane, that should be mainly transverse to the direction of movement. However, a better stability is obtained during towing when three or more cylinders form a more three-dimensional configuration, as for example appears from FIGS. 2 and 3.

FIG. 4 shows an embodiment that in a geometrical sense has much similarity to the one in FIGS. 2 and 3, i.e. with three rotating cylinders 35A, 35B and 35C arranged in a triangular configuration. The frames at either end of the cylinders however, are here in the form of plates 31 and 32 respectively, in contrast to the more open frames in FIGS. 2 and 3. With such triangular, plate shaped frames as in FIG. 4, the stability of the device during towing will be further improved, since the frame plates 31 and 32 will act in part as control surfaces in relation to the water flowing by. As in the above described embodiment there is also in FIG. 4 shown a common motor 30 which is located centrally at the underside of the lower frame plate 32, and by means of a chain, belt or the like 30A provides for the rotational movement of the three cylinders, the downwardly projecting axle studs of which are provided with chain wheels or the like 33A, 33B and 33C respectively.

In FIG. 4 there is not shown any braces between the two frame plates 31 and 32, but it is obvious that such elements can and should be incorporated in the structure, as in the example of FIG. 2. Advantageously such upright or vertical braces can have a streamlined cross sectional profile adapted to the intended direction of movement.

Purely practical and economical relationships have a certain significance to the choice of cylinder dimensions, among other things a desire to be able to use available dimensions of tubes beeing a common standard or commercial product. Another consideration is that a large cylinder diameter involves a high starting torque for the drive motor or motors.

As a drive motor there can be employed an electric motor or a hydraulic motor, with energy supply through a cable from the towing vessel.

In varying embodiments as mentioned, with one, two, three or more rotating cylinders, there is all the time the question of circular cylinders having a surface that preferably is regular or smooth.

As an example of a possible practical embodiment and a correspondingly calculated lateral force or lift, the following is mentioned:
Cylinder diameter 0.4 m
Mutual center spacing 1.5 m
Number of cylinders 3
Rate of rotation 180 revolutions per minute
Towing speed 5 knop
Laterally directed force 12 tons Compared to previously known deflectors of the trawl door type, the total outer dimensions of a deflector device or unit according to the invention is substantially smaller for obtaining the same lateral spreading force or lift.

A straddle as indicated quite schematically at 6A in FIG. 1, is shown (partially) and somewhat more in detail in FIG. 4. From four points of attachment at the respective frame plates 31 and 32, there are extended four straddle elements 36A, 36B, 36C and 36D converging at a common point (not shown) for attachment to a wire or cable piece corresponding to what is shown at 6 in FIG. 1, so as to be connected to the remaining towed arrangement and the towing vessel. During towing such a straddle with four elements 36A–D to the high degree will contribute to moving the deflector device through the water in the desired upright position. During operation this position can vary somewhat in relation to the ideal, vertical orientation, depending on many factors, such as sea current and waves.

What is claimed is:

1. A deflector for lateral spreading of equipment being towed in water by a vessel and based on the principle of a motor-driven, rotating cylinder, comprising at least two cylinders adapted to have their axes of rotation oriented substantially vertically in the water during towing, wherein a frame at one end of each cylinder and another frame at an opposite end of each cylinder are provided with bearings for said rotation.

2. A defector according to claim 1, wherein a mutual spacing between the cylinders is larger than a diameter of the cylinders.

3. A defector according to claim 1, wherein a length of each cylinder is substantially larger than the cylinders.

4. A defector according to claim 1, wherein the cylinders are so located in relation to each other that during towing they do not move directly in the wash from one another.

5. A deflector to claim 1, wherein each frame is substantially plate-shaped in a plane normal to the cylinder axes.

6. A deflector according to claim 5, wherein a drive motor is mounted at a lower frame.

7. A deflector according to claim 1, wherein each cylinder has an axle with an associated axle stud provided with a chain wheel to be driven by means of a chain that is common to the cylinders and is driven by a drive wheel belonging to a cylinder drive motor.

8. A defector according to claim 1, wherein each cylinder has a separate motor for said rotation.

9. A deflector according to claim 1, wherein each cylinder is designed so as to have a desired buoyancy in water.

10. A deflector according to claim 1, wherein a mutual spacing between the cylinders is at least twice a diameter of the cylinders.

11. A deflector according to claim 1, wherein a length of each cylinder is preferably at least twice a diameter of the cylinders.

12. A deflector for lateral spreading of equipment being towed in water by a vessel and based on the principle of a motor-driven, rotating cylinder, comprising at least three cylinders adapted to have their axes of rotation oriented substantially vertically in the water during towing.

13. A deflector according to claim 12, wherein a mutual spacing between the cylinders is at least a diameter of the cylinders.

14. A deflector according to claim 12, wherein a length of each cylinder is at least twice a diameter of the cylinders.

* * * * *